United States Patent [19]
Kuhl et al.

[11] 3,775,184
[45] Nov. 27, 1973

[54] COMPONENT FOR A FUEL ELEMENT AND A BATTERY PRODUCED WITH THESE COMPONENTS

[75] Inventors: Dieter Kühl, Bubenreuth; Hubert Poppa, Baiersdorf, both of Germany

[73] Assignee: Siemens Aktiengesellschaft, Berlin, Munich, Germany

[22] Filed: July 24, 1970

[21] Appl. No.: 58,033

[30] Foreign Application Priority Data
July 26, 1969 Germany.................. P 19 38 044.0

[52] U.S. Cl. ........................ 136/86 R, 136/120 FC
[51] Int. Cl. .................... H01m 27/04, H01m 13/00
[58] Field of Search....................... 136/86, 120 FC

[56] References Cited
UNITED STATES PATENTS
3,404,038   10/1968   Winsel ............................ 136/86 D FOREIGN PATENTS OR APPLICATIONS
1,127,860   9/1968   Great Britain ............... 136/120 FC Primary Examiner—L. Dewayne Rutledge
Assistant Examiner—M. J. Andrews
Attorney—Curt M. Avery, Arthur E. Wilfond, Herbert L. Lerner and Daniel J. Tick

[57] ABSTRACT

A component for a fuel cell element which operates on gaseous reactants or with a fuel dissolved in electrolyte. The component comprises an electricity conducting sheet. On at least one side of said sheet is at least one metallic spacer net, an electrode and a diaphragm, whose edge is tightly connected with said separating sheet and is cast into a synthetic frame, which projects unilaterally beyond the area of said separating sheet and contains channels closed with synthetic foils for inlet and outlet of the electrolyte. The separating sheet, spacer net and diaphragm are provided with diametrically opposed lugs.

3 Claims, 9 Drawing Figures

COMPONENT FOR A FUEL ELEMENT AND A BATTERY PRODUCED WITH THESE COMPONENTS

The present invention relates to a component for fuel cell elements, which considerably improves and facilitates the construction of batteries.

German Published Application 1,238,083 discloses a fuel cell battery with electrodes of pressed or sintered bodies which can be stacked and which have a border of thermoplastic synthetic material, which encloses the electrodes; fills in the marginal pores of the electrode edge; extends, at least unilaterally, beyond the electrode area; and has sealing areas. This eliminates the usually required special packing members for the electrode. The sealing of the electrolyte and gas chambers, as well as the provision of inlets and outlets for the electrolyte and the reactants, necessitates a considerable expenditure of time as well as technology.

The object of the invention was to find a component for fuel cell elements which can be arranged in an alternating sequence with the support structure, respectively the support structure and electrode, so that it can be cast into a battery with the aid of a cast mass, without said mass penetrating into the gas chambers or electrolyte chambers.

We achieve this object by providing a component which consists of an electrically conducting separating sheet, at least one of whose sides is provided with one or more metallic spacer nets, an electrode, and a diaphragm whose edge is tightly connected with the separating sheet and cast into a synthetic frame, which projects unilaterally beyond the area of the separating sheet and contains channels, sealed with synthetic foils for the inlet and outlet of the electrolyte. The dividing sheet, the spacing net and the diaphragm are provided with diametrically opposed lugs.

The object of the invention will be disclosed in greater detail with respect to the drawing in which:

FIG. 1c is a top view of FIG. 1a;

Figure 1D:
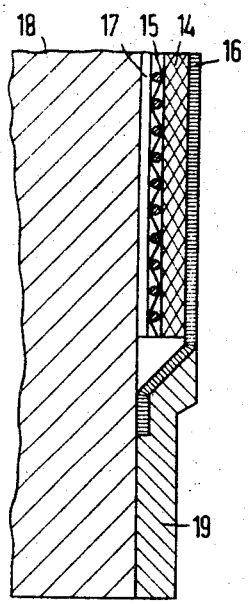
FIGS. 1a, 1d and 1e show in section a first embodiment consisting of the center and ends respectively of a fuel cell component.
Figure 1A:
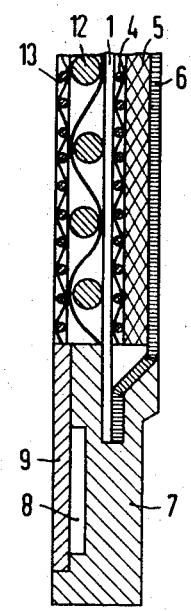

FIG. 1a shows a section through a side of a component, which is particularly suited for the construction of fuel cell batteries, utilizing a fuel dissolved in the electrolyte, such as hydrazine in KOH. In this Figure, 1 is a separating sheet of nickel which has sides of 106 mm long and which is 0.3 mm thick. The diametrically opposed lugs (4 × 23 mm) of the separating sheet are not shown in FIG. 1a, but are seen in FIG. 1b where they are given reference numerals 2 and 3. The spacer net 4 which defines the gas chamber is also provided with diametrically opposed lugs (4 × 17 mm) and has a side length of 100 mm and a thickness of 0.3 mm. This is followed by electrode 5, which in the embodiment example consists of Raney silver, whose particles are interconnected through a synthetic dispersion. The thickness of the electrode is about 0.9 mm with a side length to 100 mm. The asbestos paper diaphragm 6 is glued along the rim of the separating sheet 1 and is also provided with two diametrically opposed lugs. The diaphragm is about 0.35 mm thick and has a side length of 106 mm. The casting frame which takes up the nickel sheet and the diaphragm are embedded, is indicated with 7 and the foils which cover the electrolyte channels 8, are given numeral 9.

The pasting of the diaphragm to the nickel sheet 1 is best effected under pressure and with the same casting resin which is subsequently used for casting the individual pieces, for example with epoxy resin. After the adhesive has hardened, the component is placed into a casting mold and cast with epoxy resin in such a manner that two electrolyte channels 8, which open upward, form in the frame. Following the hardening of the casting resin, each channel is covered and glued to one epoxy resin foil 9.

Figure 1E:
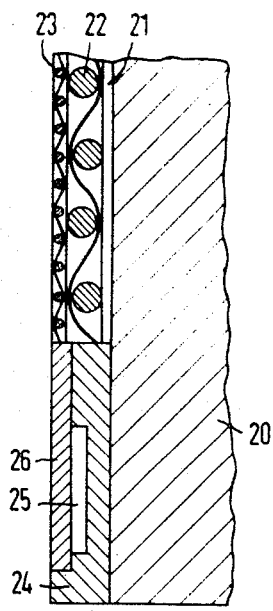
Figure 1B:
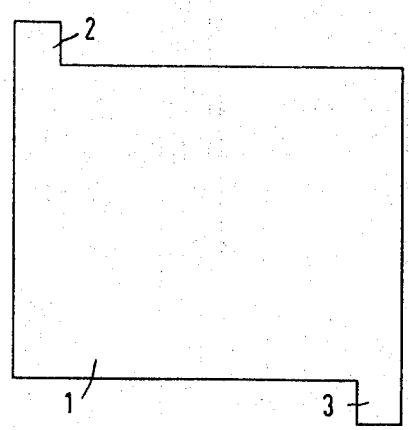
FIG. 1b shows a separating sheet.
Figure 1C:
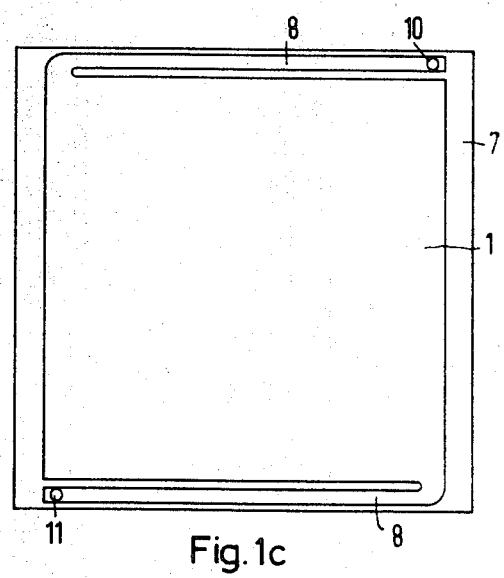

FIG. 1c shows the component according to the invention in a top view and again 7 denotes the casting frame, an electrolyte channel is seen at 8. The inlet and outlet for the electrolyte are seen at 10 and 11 respectively. The nickel sheet cast around with epoxy resin is denoted as 1, the same as in FIG. 1a.

During the construction of a battery, the support structure 12 consisting of one or more nets and defining the electrolyte chamber is placed on the other side of the nickel sheet 1, in the component according to FIG. 1a. The anode net electrode 13 is coated with Raney nickel. The adjacent arrangement of these components results in a plurality of fuel elements, which are so sealed toward the outside that during the subsequent casting, the casting resin cannot penetrate the fuel elements. At both ends of the thus stacked fuel elements lies only one respective fuel element half so that the end plates according to FIGS. 1d and 1e constitute either only the cathode and a gas chamber or only the anode and an electrolyte chamber.

FIG. 1d shows a component which contains the cathode 14, the spacing net 15, the diaphragm 16 and nickel sheet 17 and the end plate 18, the diaphragm 16 being directly glued with the end plate 18. The synthetic frame is indicated with 19.

A component which contains the electrolyte side of a fuel element is shown in FIG. 1e, wherein the end plate is denoted 20, the dividing sheet 21, the support structure 22 and the electrode, coated with Raney nickel, with 23. The casting frame 24 contains the electrolyte channels 25 which are pasted with the epoxy resin foils 26, and which are used either for the inlet or the outlet of the electrolyte.

After stacking the components, in a casting mold, with the aid of positioning device, and pressing these components together, the battery is cast into a block with an epoxy resin mass, hardened, deformed and hardened some more, under heat, for 2 hours at approximately 70°C. Thereafter, the series connected lugs of the nickel sheets, nets and diaphragm are provided with bores for the supply and removal of the gas respectively. After attaching the tube connections and filling in the reactants, or the electrolyte, the battery may be set into operation.

Figure 2A:
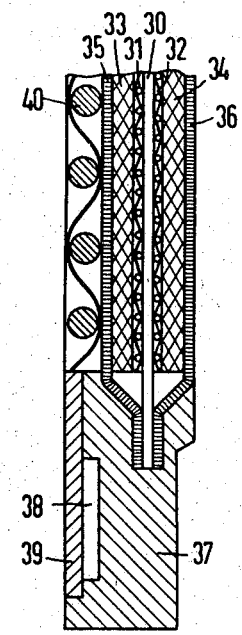
FIGS. 2a, 2b and 2c show a second embodiment.
Figure 2B:
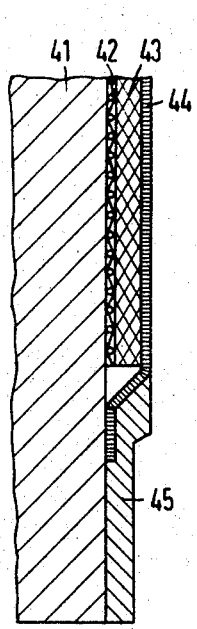
Figure 2C:
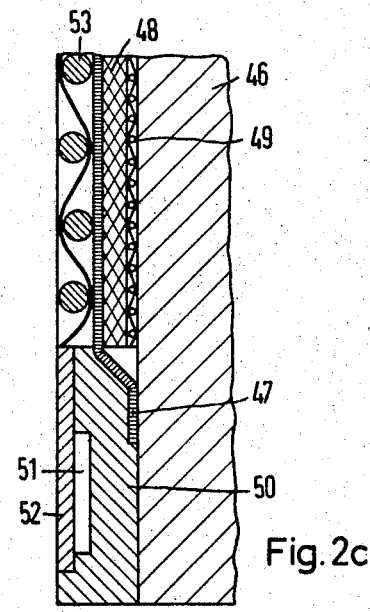

According to the embodiment shown in FIGS. 2a, 2b and 2c, the dividing sheet located in the casting frame of the component, can be provided bilaterally with one spacing net, an electrode and a diaphragm so that a complete component will contain two gas chambers and two electrodes. The nickel sheet is depicted in FIG. 2a as 30, the spacing net as 31 or 32, the anode as 33, the cathode as 34 and the diaphragm glued with the dividing sheet as 35 or 36, respectively. The casting frame 37 has the electrolyte channels 38 therein and the casting resin foils 39 glued thereon. The electrolyte chamber is formed in a simple way, following the hardening of the casting frame and the gluing of the electrolyte channels, through the insertion of a support structure 40, into the projecting portion of the frame.

FIGS. 2b and 2c show the components which are necessary for supplementing the end positioned fuel element halves, in the stack, with the gas side or electrolyte side of a fuel element.

The component of FIG. 2b contains on the epoxy plate 41 (end plate), the spacing net 42, the electrode 43 and the diaphragm 44, glued with the end plate 41 and cast at the rim into the frame 45.

The end positioned electrolyte side of the fuel cell battery is shown in FIG. 2c. The diaphragm 47 is glued with the epoxide plate 46 and encloses the electrode 48 and the gas chamber, defined by the spacing net 49. The casting frame 50 has electrolyte channels 51 and the cover foils 52. The electrode chamber is again formed by the projection portion of the synthetic frame 50 into which a support structure 53 is loosely inserted. The casting of the stacked fuel elements and the production of the gas channels and electrolyte channels is effected as in the preceding Example, by casting with epoxy resin and putting bores into the lugs of the diaphragms the spacing nets and the dividing sheets.

The fuel cell battery, fashioned from the components according to FIGS. 2a, 2b and 2c, is especially provided for fuel elements operated with gaseous reactants, such as, for example, hydrogen and oxygen.

Figure 3:
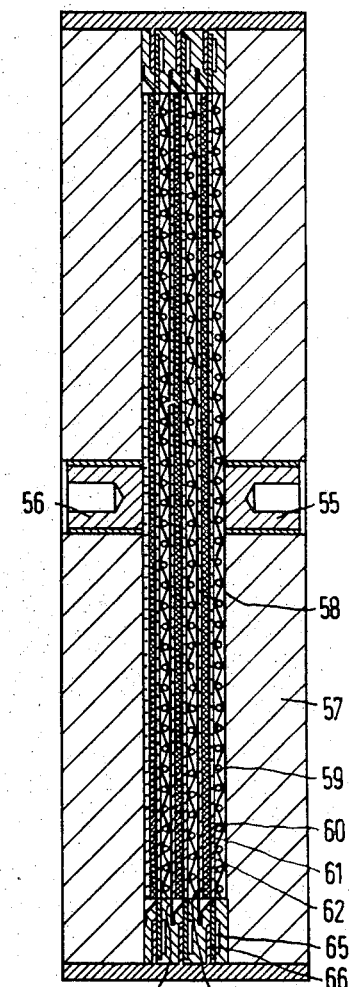
FIG. 3 shows a fuel cell battery incorporating the first embodiment.

FIG. 3 shows a fuel cell battery, constructed out of components according to FIGS. 1a, 1d and 1e. The numerals 55 and 56 denote the current collectors, 57 the end plates and 58 the nickel sheets. At 59 is a respective support structure in the electrolyte chamber and at 60 a net electrode activated with Raney nickel. Between the oxygen electrode 62 and the net electrode 60 is diaphragm 61 and behind the oxygen electrode, the gas chamber net 63, with the contact sheet 64. The electrolyte is introduced via the channels 65 which are glued together with epoxide resin plates 66. In this battery, the fuel for example hydrazine is supplied via the electrolyte.

We claim:

1. A component for fuel cell element, which operates on gaseous reactants or with a fuel dissolved in electrolyte, which comprises an electrically conducting separating sheet sequentially arranged on at least one side of said separating sheet, at least one metallic spacer net, an electrode and a diaphragm, said diaphragm having a rim tightly connected with said separating sheet and embedded within a synthetic frame, said synthetic frame projecting unilaterally beyond the area of said separating sheet, said frame containing channels covered with synthetic foils forming an inlet and outlet for the electrolyte, said separating sheet, spacer net and diaphragm being each provided with diametrically opposed lugs along the rim, said lugs being in series with one another.

2. A battery composed of a plurality of components, wherein each component contains a separating sheet, both sides of said separating sheet being provided sequentially with at least one spacer net, an electrode and a diaphragm, said diaphragm having a rim tightly connected with said separating sheet and embedded within a synthetic frame, said synthetic frame projecting unilaterally beyond the area of said separating sheet, said frame containing channels covered with synthetic foils forming an inlet and outlet for the electrolyte, said separating sheet, spacer net and diaphragm being each provided with diametrically opposed lugs along the rim, said lugs being in series with one another, one side of the component being provided with a support structure at the diaphragm, the components with the support structure being stacked upon each other and arranged between two end plates, which contain half-cells with electrodes of opposite polarity, one of the half-cells being comprised of at least one spacer net, one electrode and one diaphragm sequentially arranged and the other half-cell comprising at least one spacer net, one electrode and, one diaphragm and one support structure, the end plates together with the half-cells and the interpositioned components including the support structures, being embedded within casting resin so as to form a battery block, said battery block being provided with bores for the inlet and outlet of the electrolyte and the reactants, and with current collectors, said current collectors being electrically connected with the electrode of the half-cell.

3. A battery composed of a plurality of components wherein each component has a separating sheet, one side of said separating sheet being provided sequentially, with at least one spacer net, one electrode and one diaphragm, the other side of the separating sheet being provided, sequentially, with a support structure and an adjacent electrode, the components with the inserted support structures and electrodes being stacked upon each other and positioned between two end plates, which comprise half-cells with electrodes of opposite polarity, one of the half-cells comprising in sequential arrangement a separating sheet, at least one spacer net, an electrode and a diaphragm, and the other half-cell comprising a separating sheet, a support structure and an electrode, and the end plates with the half-cells and the interpositioned components together with the support structures and electrodes, being embedded within casting resin so as to form a battery block, said battery block being provided with bores for the inlet and outlet of the electrolyte and the reactants, and with current collectors, said current collectors being electrically connected with the separating sheet of the half-cells.

* * * * *